US010616405B1

(12) United States Patent
Tkaczyk

(10) Patent No.: US 10,616,405 B1
(45) Date of Patent: Apr. 7, 2020

(54) UTILIZING CALLER ID FOR MANAGING A MOBILE DEVICE

(71) Applicant: INTERNATIONAL BUSINESS MACHINES CORPORATION, Armonk, NY (US)

(72) Inventor: Gregory M. J. H. Tkaczyk, Burlington (CA)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/136,225

(22) Filed: Sep. 19, 2018

(51) Int. Cl.
H04W 4/00 (2018.01)
H04M 3/42 (2006.01)
H04L 29/06 (2006.01)
H04W 4/16 (2009.01)

(52) U.S. Cl.
CPC .... *H04M 3/42042* (2013.01); *H04L 63/1466* (2013.01); *H04W 4/16* (2013.01); *H04M 2203/558* (2013.01)

(58) Field of Classification Search
CPC ......... H04M 3/42042; H04M 3/42059; H04M 3/42068
See application file for complete search history.

(56) References Cited

U.S. PATENT DOCUMENTS

| 9,794,787 | B2 | 10/2017 | Kenney | |
| 2014/0199976 | A1* | 7/2014 | Yang | H04L 12/12 455/415 |
| 2014/0253666 | A1* | 9/2014 | Ramachandran | H04W 4/12 348/14.06 |
| 2014/0274008 | A1 | 9/2014 | Olodort | |
| 2014/0338006 | A1 | 11/2014 | Grkov et al. | |
| 2019/0005488 | A1* | 1/2019 | Dietrich | G06Q 20/351 |

* cited by examiner

*Primary Examiner* — Omoniyi Obayanju
(74) *Attorney, Agent, or Firm* — Monchai Chuaychoo

(57) ABSTRACT

A method, system or computer usable program product for utilizing caller identification (ID) for managing a mobile device including receiving a policy for invoking an executive function on the mobile device upon a first condition being met wherein the executive function is a function performed by a processor of the mobile device beyond call filtering; determining a caller ID associated with the executive function; providing a caller ID application to the mobile device which will perform the executive function upon the mobile device receiving a phone call with the caller ID that is associated with the executive function; and responsive to meeting the first condition of the policy, placing a phone call to the mobile device with a caller ID matching the caller ID associated with the executive function.

17 Claims, 10 Drawing Sheets

FIG. 6

| REFERENCE # 610 | VERSION 613 | LAST UPDATED 616 |
|---|---|---|
| # OF CALLER ID'S 620 | TIMING REQ. 623 | MATCH REQ. 626 |
| NUMERIC ID(S) 633 | | ALPHANUMERIC ID(S) 636 |
| EXECUTIVE FUNCTION(S) 640 | | |

600

630 { (bracketing the NUMERIC ID(S) / ALPHANUMERIC ID(S) row)

FIG. 9A

GENERAL POLICY DATABASE

900

| POLICY # | CLASS | CONDITION(S) | REF. # | REF. # |
|---|---|---|---|---|
| 001 | ALL | DEVICE LOST, NO TRIES | 001 | — |
| 002 | ALL | DEVICE LOST, TRIED TWICE | 002 | 003 |
| 003 | MOBILE PHONES | WORKER QUIT | 004 | 005 |
| 004 | MOBILE PHONES | WORKER ABSENT | 006 | — |
| " " | " " | " " | " " | " " |

GENERAL USER PREFERENCES DATABASE 940

| REF. # | CLASS | # | TIME | ORDER | OTHER | UPDATE |
|---|---|---|---|---|---|---|
| 001 | ALL | 1 | N/A | N/A | — | QTLY |
| 002 | MOBILE PHONE | 3 | 5 | SEQ. | — | WEEKLY |
| 002 | OTHER | 2 | 10 | SEQ. | — | MONTHLY |
| 003 | ALL | 3 | 5 | RANDOM | — | WEEKLY |
| 004 | ALL | 2 | 5 | RANDOM | — | MONTHLY |
| " " | " " | " " | " " | " " | " " | " " |

EXECUTIVE FUNCTION DATABASE 980

| REF. # | DESCRIPTION | DATA/CODE |
|---|---|---|
| 001 | SEND LOCATION BY TEXT | ~ |
| 002 | PERFORM FACTORY RESET | ~ |
| 003 | TURN ON WIFI | ~ |
| " " | " " | " " |

982, 984, 990, 992, 994

UTILIZING CALLER ID FOR MANAGING A MOBILE DEVICE

BACKGROUND

1. Technical Field

The present invention relates generally to utilizing caller identification (caller ID) for managing a mobile device, and in particular, to a computer implemented method for utilizing a telephone service provided caller ID accompanying a phone call to manage certain functions of a mobile device receiving the phone call.

2. Description of Related Art

For several decades, phone service providers have provided a caller identification (caller ID) with each phone call sent to a phone. This allows the recipient of the phone call to see who is calling that call recipient. Although several standards exist for providing caller ID, typically it includes a numeric identification (numeric ID) and an alphanumeric identification (alpha ID). The numeric identification is typically the phone number of the person or entity making the phone call to the recipient. The alphanumeric identification is typically the name or other description of the person or entity making the phone call to the recipient. The recipient can then decide whether to answer the phone call or not based on the caller ID. In addition, the recipient may program his phone to filter phone calls (i.e., block or allow) for certain caller IDs.

SUMMARY

The illustrative embodiments provide a method, system, and computer usable program product for utilizing caller identification (ID) for managing a mobile device including receiving a policy for invoking an executive function on the mobile device upon a first condition being met wherein the executive function is a function performed by a processor of the mobile device beyond call filtering; determining a caller ID associated with the executive function; providing a caller ID application to the mobile device which will perform the executive function upon the mobile device receiving a phone call with the caller ID that is associated with the executive function; and responsive to meeting the first condition of the policy, placing a phone call to the mobile device with a caller ID matching the caller ID associated with the executive function.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIG. 6 is a block diagram of an illustrative record in a caller ID data file in which various embodiments may be implemented;

FIGS. 9A-9C are block diagrams of illustrative policy, user preference and reference databases in which various embodiments may be implemented.

DETAILED DESCRIPTION

Processes and devices may be implemented and utilized for utilizing caller identification (caller ID) for managing a mobile device. These processes and apparatuses may be implemented and utilized as will be explained with reference to the various embodiments below.

Figure 1:
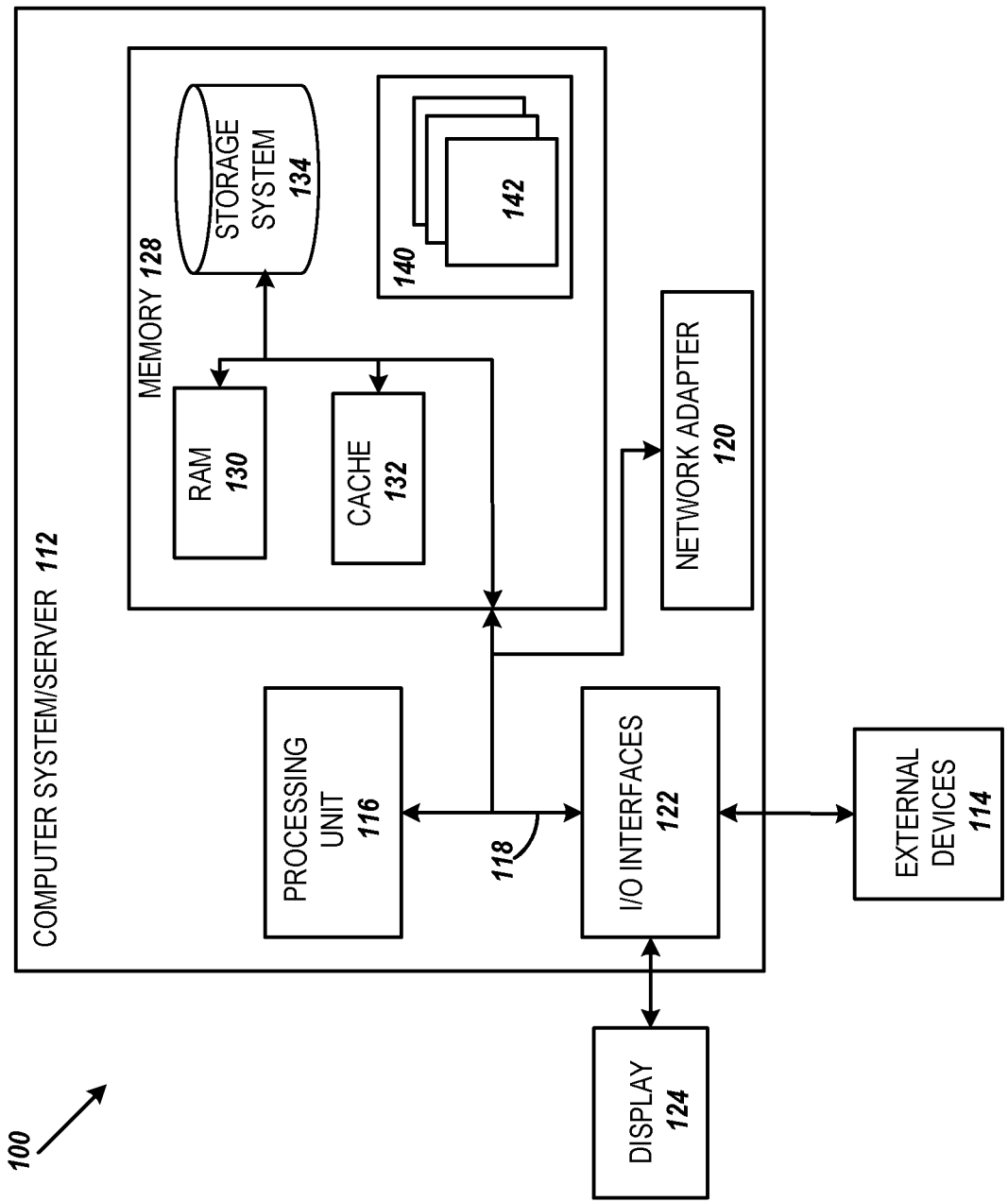
FIG. 1 is a block diagram of an illustrative data processing system in which various embodiments of the present disclosure may be implemented.

FIG. 1 is a block diagram of an illustrative data processing system in which various embodiments of the present disclosure may be implemented. Data processing system 100 is one example of a suitable data processing system and is not intended to suggest any limitation as to the scope of use or functionality of the embodiments described herein. Regardless, data processing system 100 is capable of being implemented and/or performing any of the functionality set forth herein such as utilizing caller ID for managing a mobile device.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of non-transitory computer system usable media. Such media may be any available media that is accessible by computer system/server 112, and it includes both volatile and non-volatile media, removable and non-removable media.

System memory 128 can include non-transitory computer system readable media in the form of volatile memory, such as random access memory (RAM) 130 and/or cache memory 132. Computer system/server 112 may further include other non-transitory removable/non-removable, volatile/non-volatile computer system storage media. By way of example, storage system 134 can be provided for reading from and writing to a non-removable, non-volatile magnetic media (not shown and typically called a "hard drive"). Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of the embodiments. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of the embodiments. For example, a program module may be software for utilizing caller ID for managing a mobile device.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
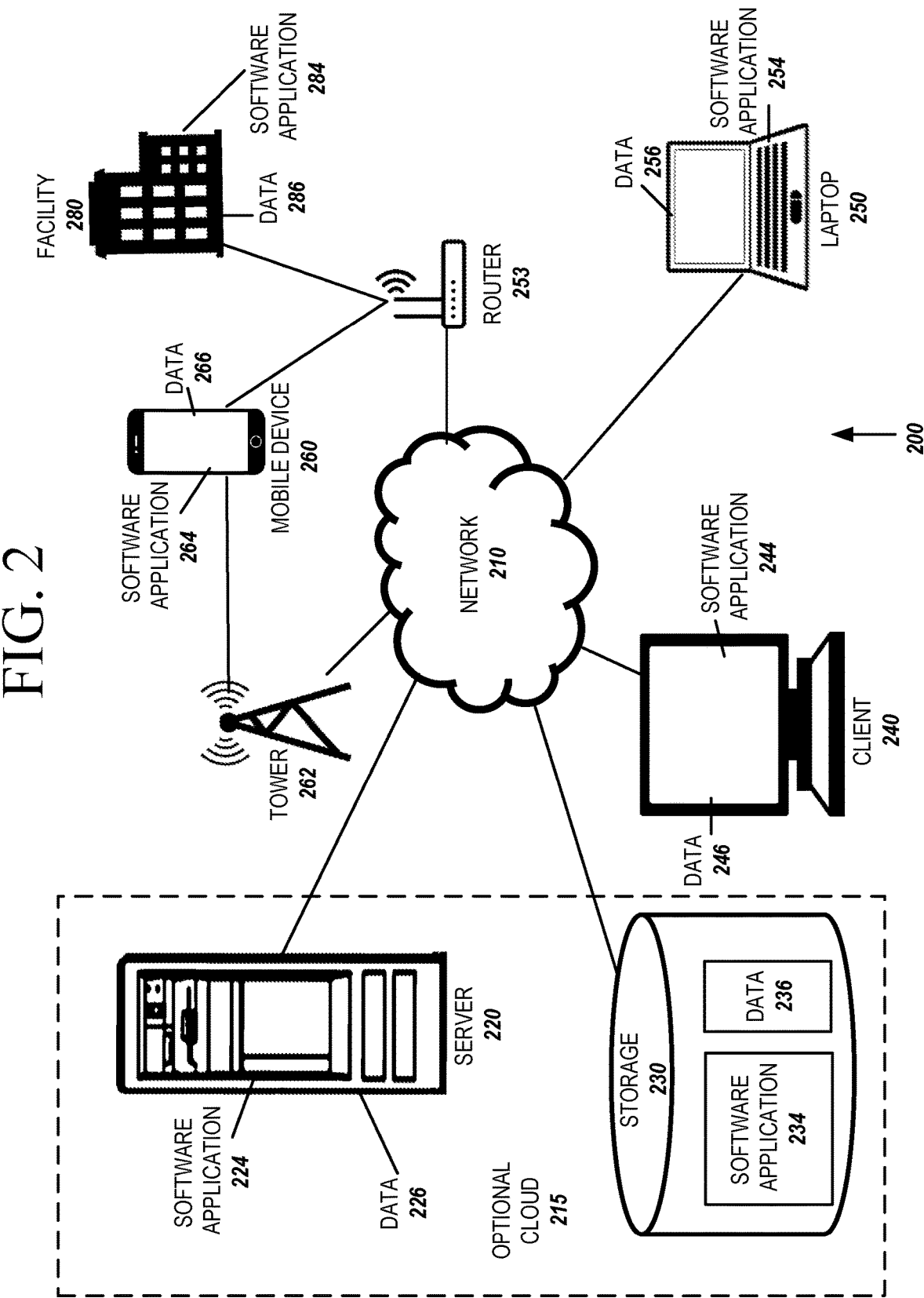
FIG. 2 is a block diagram of an illustrative network of data processing systems in which various embodiments of the present disclosure may be implemented.

FIG. 2 is a block diagram of an illustrative network of data processing systems in which various embodiments of the present disclosure may be implemented. Data processing environment 200 is a network of data processing systems such as described above with reference to FIG. 1. Many of these data processing systems may be hardware systems or virtualized, locally or remotely such as in a cloud environment. Software applications such as for utilizing caller ID for managing a mobile device may execute on any computer or other type of data processing system in data processing environment 200. Data processing environment 200 includes network 210 and optional cloud 215. Network 210 is the medium used to provide simplex, half duplex and/or full duplex communications links between various devices and computers connected together within data processing environment 200. Network 210 may include connections such as wire, wireless communication links, or fiber optic cables. Optional cloud 215 may be a cloud computing environment for remotely processing data and code or remote memory storage for managing data remotely. Optional cloud 215 may be a single cloud environment or multiple cloud environments spread across one or more entities.

Server 220 and client 240 are coupled to network 210 along with storage unit 230. Server 220 and storage 230 may be virtualized and/or reside in optional cloud 215. Client 240 and other computing and storage elements, or portions thereof, may also reside within optional cloud 215. In addition, laptop 250 and facility 280 (such as a home or business) are coupled to network 210 including wirelessly such as through a network router 253. Network router 253 may be connected with network 210, including through another router, through wires such as a phone line, coaxial cable, Ethernet cable, optical fiber, etc. Network Router 253 may also be connected with network 210 through a variety of wireless connections such as a cellular, radio or microwave connection, including through another router. A mobile device 260 may be coupled to network 210 through a cellular tower 262 or through a router 253 such as through a WiFi connection. Mobile device 260 may be a cell phone with limited functions, a smart phone, or other type of mobile device that can receive caller ID through a cellular or other telephone based systems. Mobile device 260 can also include mobile devices that can receive caller ID through a network connection such as personal digital assistants (PDAs), tablets and netbooks. Cellular tower 262 can be connected through a telephone system to network 210. Additional mobile devices may call or be called from mobile device 260 directly through this telephone system or through network 210. Data processing systems, such as server 220, client 240, laptop 250, mobile device 260 and facility 280 contain data and have software applications including software tools executing thereon. Other types of data processing systems that are mobile devices that can receive caller ID through various types of connectivity including a network connection include personal digital assistants (PDAs), smartphones, tablets and netbooks.

Server 220 may include software application 224 and data 226 for utilizing caller ID for managing a mobile device or other software applications and data in accordance with embodiments described herein. Storage 230 may contain software application 234 and a content source such as data 236 for utilizing caller ID for managing a mobile device. Other software and content may be stored on storage 230 for sharing among various computer or other data processing devices. Client 240 may include software application 244 and data 246. Laptop 250 and mobile device 260 may also include software applications 254 and 264 and data 256 and 266. Facility 280 may include software applications 284 and data 286. Other types of data processing systems coupled to network 210 may also include software applications. Software applications could include a web browser, email, or other software application for utilizing caller ID for managing a mobile device.

Server 220, storage unit 230, client 240, laptop 250, mobile device 260, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile device 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3:
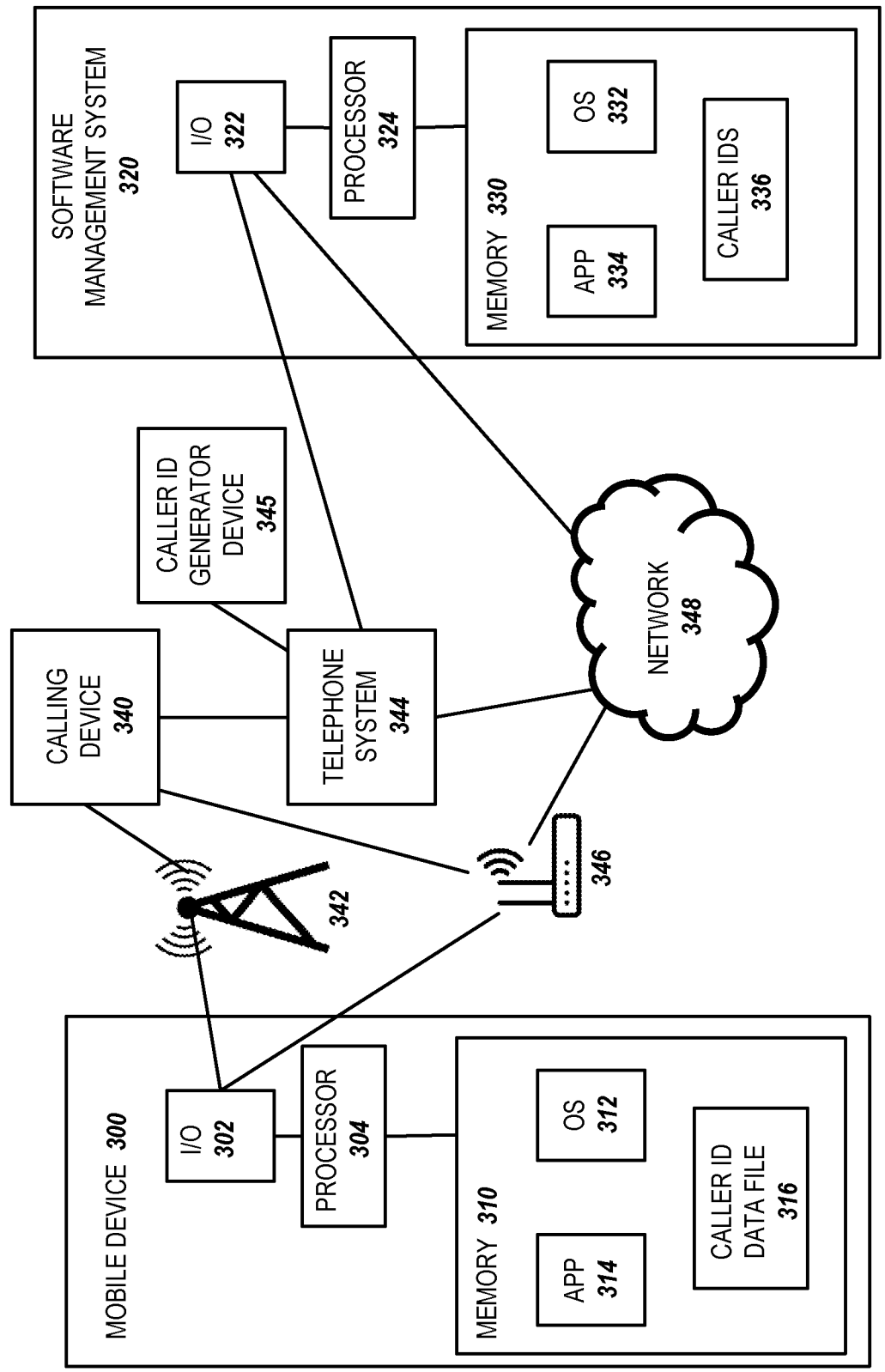
FIG. 3 is a block diagram of an illustrative mobile device with software for performing executive functions in response to detecting a matching caller ID in which various embodiments of the present disclosure may be implemented.

FIG. 3 is a block diagram of an illustrative mobile device with software for performing an executive function in response to detecting a matching caller ID in which various embodiments of the present disclosure may be implemented. An executive function is a function to be performed by the mobile device upon receiving a specific caller ID(s). This executive function is a function performed by the mobile device processor that manages function of the mobile device beyond (other than) call filtering. While call filtering includes blocking or allowing phone calls to the user based on the caller ID, executive functions require the mobile device processor to perform functions that are not directly related to or just managing incoming phone calls. That is, an executive function does not include call filtering, but is a function performed by a processor of the mobile device beyond call filtering. Executive functions include preventing the user from turning off the mobile device, erasing certain data and code from the mobile device, generating and sending a location of the mobile device, executing commands, making configuration changes, executing software, performing a factory reset of the mobile device, sending an email or text, or other functions that do not include call filtering. An executive function includes software and data previously stored on the mobile device with associated caller IDs, and which is invoked for processing by the mobile device processor upon receiving one or more phone calls with caller IDs matching the previously stored caller IDs. There are other calling functions that can be performed by a mobile device that involve the placing or managing of phone calls.

FIG. 3 is directed to a mobile device such as a smartphone with a software application or an operating system (OS) function or capability for causing the mobile device to perform an executive function in response to detecting a matching caller ID. This software application or operating system function/capability is referred to herein as a caller ID application (App). The caller ID application can be a third party software application provided for selection by a user of the mobile device and downloaded by that user onto the mobile device. For example, a phone service provider may wish to locate a mobile device, such as if the owner of the mobile device has notified the phone service provider that the mobile device has been lost or stolen. As a result, the phone service provider may wish to just call the mobile device as described herein to cause the device to send its location to phone service provider or other designated person or entity.

The caller ID application can also be an enterprise based software system, defined herein as enterprise mobile device management (EMDM) software, for managing mobile devices that can access the networks and data of that enterprise. EMDM software can include mobile device management (MDM) software, mobile application management (MAM) software, unified endpoint management (UEM) software, enterprise mobility management (EMM) software, and many other types of software that may be incorporated by an enterprise onto a mobile device for managing the software and data of that enterprise on or accessible by the mobile device. EMDM software can be implemented in an optional cloud, public or private, and could be implemented as Infrastructure as a Service (IaaS), Platform as a Service (PaaS), or Software as a Service (SaaS) platforms. In the case of EMDM software, the user of the mobile device may download a client version of the EMDM software onto the mobile device at the direction of the enterprise, or an authorized person in the enterprise may download the client version of the EMDM software onto the mobile device. For example, upon a user leaving employment of the enterprise, the enterprise may wish to delete certain software and data from the mobile device. Furthermore, where the enterprise owns the mobile device, the enterprise may want to locate the device and/or disable the device until it is recovered. This can be difficult if the now ex-worker has turned off any WiFi or other networking functions of the mobile device. This can be accomplished by simply calling the mobile device with specific caller ID(s) to cause the mobile device to perform an associated executive function, such as erasing certain data and software. A server or master version of the enterprise mobile device management (EMDM) software can be implemented by utilizing a server based management function on a server or other enterprise managed device and by utilizing a mobile device based component such as a client version of the EMDM software for implementing executive functions upon receiving a phone call with an associated caller ID(s). This will be described with illustrative examples in greater detail below.

A mobile device 300 can communicate with a software management system 320 or a calling device 340 through a variety of systems. Mobile device 300 can be a cell phone, a smart phone, or other type of mobile device that can receive caller ID through a cellular or other telephone based systems. Mobile device 300 can also include mobile devices that can receive caller ID through a network connection such as personal digital assistants (PDAs), tablets and netbooks. Software management system 320 can be a server, a desktop or deskside system, or even another mobile device. Software management system 320 can be located in a cloud environment. The functions of software management system can be spread out across multiple systems and even across multiple cloud environments. For example, software for downloading to a mobile device can be on one system, the caller ID lists described below could be on another more secure system, and the server/master device for managing the caller ID process and implementation could be on another secure system. Calling device 340 can include any device capable of making a phone call with a specific caller ID to mobile device 300. These devices can communicate with each other through an antenna 342, telephone system 344, a router 346 and a network 348 such as the internet or a local area network. A caller ID generating device 345 may also be utilized to generate a desired caller ID and generate a phone call to a desired mobile device. For example, mobile device 340 may call caller ID generating device 345, establish a connection, provide a desired caller ID and the phone number of the desired call. Caller ID generating device 345 can then place a phone call to the desired mobile device using the desired caller ID, such as through a technique commonly known as spoofing, as an intermediary between mobile device 340 and mobile device 300. Alternatively, an application that performs this function can be downloaded onto or otherwise programmed on mobile device 340 or onto any other authorized device designating for placing a call with a desired caller ID.

Mobile device 300 includes an input/output (I/O) device 302 for communicating with other devices. Mobile device 300 also includes a processor 304 and a memory 310 for processing and storing software and data. Memory 310 includes an operating system (OS) 312, a caller ID application (App) 314 for identifying caller ID matches, and a caller ID data file 316 including a set of caller IDs with associated executive functions to perform upon the occurrence of a caller ID match. Caller ID application 314 may also be incorporated into OS 312 as a function or other capability. Software management system 320 includes an input/output (I/O) device 322 for communicating with other devices, as well as a processor 324 and a memory 330 for processing and storing software and data. In this embodiment, memory 330 includes an operating system (OS) 332, as well as a server or master version of a caller ID application (App) 334 for identifying caller ID matches. Memory 330 may optionally include policies for implementing the caller ID based executive functions, a set of caller IDs 336 with associated executive functions for a mobile device to perform upon the occurrence of a caller ID match. However, these caller IDs and associated executive functions for a given mobile device may be stored in memory 330 or elsewhere such as in a cloud environment where they can be downloaded as needed to mobile device 300.

As described below in greater detail, mobile device 300 can download App 314 from software management system 320. This can be accomplished through a variety of approaches including using mobile device 300 to contact software management system 320 through a WiFi or other network connection through router 346 and network 348. Alternatively, the app may be downloaded through a phone call to the software management system using a modem through antenna 342, telephone system 344 and possibly through network 348. Caller ID data file 316 may be similarly downloaded from software management system 320 or other location where they are stored. Caller ID data file 316 may also be configured by a user of mobile device 300 such as through a menu of App 314.

When an authorized person wants to utilize caller ID to request mobile device 300 to perform a specific executive function, the authorized person calls mobile device 300 utilizing a caller ID associated with the desired executive function in caller ID data file. This can be accomplished by a phone call from calling device 340 through telephone system 344 and antenna 342, possibly by using caller ID generating device 345. This can also be similarly accomplished by software management system 320.

Figure 4:
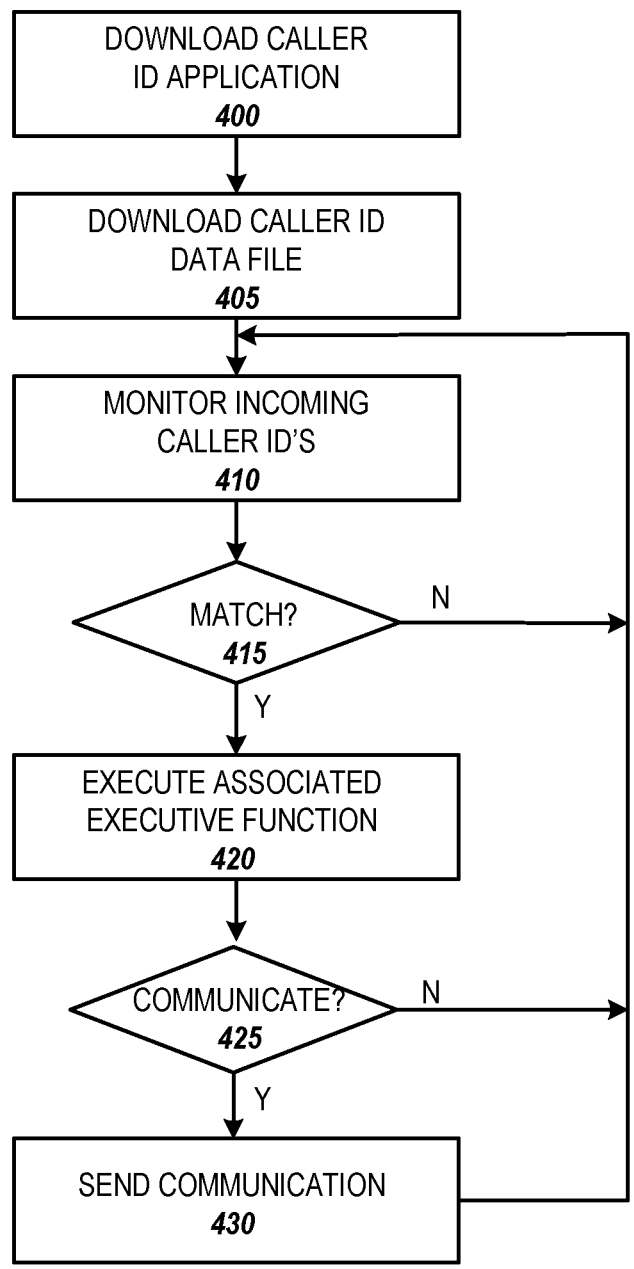
FIG. 4 is a flow diagram of a mobile device implementing an illustrative caller ID management function in accordance with a first embodiment of the invention.

FIG. 4 is a flow diagram of a mobile device implementing a caller ID management function in accordance with a first embodiment of the invention. In this embodiment, a single phone call to the mobile device with a predesignated caller ID can cause the mobile device to execute a preloaded function associated with that caller ID. The second embodiment described below discusses various options with utilizing multiple phone calls with caller IDs to cause the mobile device to execute preloaded functions associated with those caller IDs.

In a first step 400, a caller ID application (App) for performing executive functions in response to a receiving a matching caller ID is downloaded onto the mobile device in memory. This caller ID application can be the client side of an enterprise mobile device management (EMDM) software as described herein. This downloading can be accomplished through a hardware port to the mobile device, a network connection, such as WiFi or Bluetooth, with the mobile device, a phone call with the device, a cellular connection, or other methods of downloading authorized software onto the mobile device. This downloading may also be performed by the user of the mobile device by logging into a website through a browser to install the caller ID application or through an App store provided by the mobile device manufacturer, the enterprise providing access to their data and software, or any other provider of software applications for mobile devices. Alternatively, the mobile device may be given to a local information technology (IT) professional to download the caller ID application through a variety of connections as described above. If the caller ID application functionality is built into the operating system, then no downloading may be necessary.

In a second step 405, certain predesignated caller ID codes and associated executive functions are also downloaded or otherwise configured on the mobile device as a caller ID data file onto the mobile device in memory. This step can be performed as the caller ID application is downloaded or it can be performed later with the authorization of the caller ID application. This step can also be repeated over time with authorization of the caller ID application to replace, update or add to the caller IDs and associated specific functions as needed. This step can also be performed through the use of a graphical user interface on the mobile device or other similar capability. Each caller ID can include a specific numeric identification (numeric ID), a specific alphanumeric identification (alpha ID), or a combination of both. A separate field may also be utilized to designate which IDs are required for a full match. That is, only a match of the numeric ID may be needed, so the separate field could indicate that no match is needed of the alpha ID. Alternatively, storing a null or dummy value in the numeric or alpha ID can identify what combination is needed for a match. Various software functions can be stored as code in memory for execution upon finding a caller ID match. For example, the numeric ID can be 888-555-8888 and the alpha ID can be ABC-XYZ to comprise a caller ID associated with an executive function.

The executive function is a function to be performed by the caller ID application on the mobile device upon receiving the associated caller ID. For example, the executive function may be to erase certain confidential data loaded on the mobile device, to shut down the phone permanently, to erase or disable the caller ID application from the mobile device, to send a location of the mobile device to a predesignated phone number, email address, website, or other recipient, to enable cellular, WiFi or other location tracking capabilities, etc.

In step 410, the caller ID application on the mobile device monitors the caller ID of all incoming phone calls to the mobile device. Of course, the caller ID can be a spoofed caller ID as described below with reference to FIG. 7. In step 415, an incoming phone call caller ID is compared to each of the predesignated caller IDs stored in memory from step 405 above. If there is not a match, then processing returns to step 410. If there is a match, then processing continues to step 420.

In step 420, the caller ID application then causes the operating system of the mobile device to execute the executive function stored in memory. That is, the executive function associated with the just received caller ID is loaded into executable memory and executed to perform that executive function. This can occur whether the mobile device user answers the phone call or not. The executive function can include preventing the user from shutting down the mobile device until the executive function is completed. Once the executive function is completed, then processing continues to step 425 unless the just executed executive function causes an alternative action to be taken by the mobile device. In step 425 it is determined whether the mobile device should communicate success or failure of performing the executive function or even the location of the mobile device. This decision may be standard for every executive function or may vary by executive function. Alternatively, only failures or successes may be communicated. In another alternative, no such determination may be made and steps 555-560 can be eliminated. If such a communication is expected, then processing continues to step 430, otherwise processing returns to step 410 above. In step 430, this communication of success or failure or even location of the mobile device can be performed by making a phone call to a predesignated phone number. In this case, the caller ID of the mobile device will indicate which mobile device is calling to indicate success or failure of the executive function. Alternatively, the mobile device may send a text message, email or other communication to a predesignated phone number or address. In another alternative, the matching caller ID used to invoke the executive function may include a phone number or address for the mobile device to contact. That is, the match may be of the alphanumeric ID and the numeric ID may be the phone number for texting success or failure or it may point to a pre-stored phone number or other message destination in the mobile device. Processing then returns to step 410 above.

Figure 5:
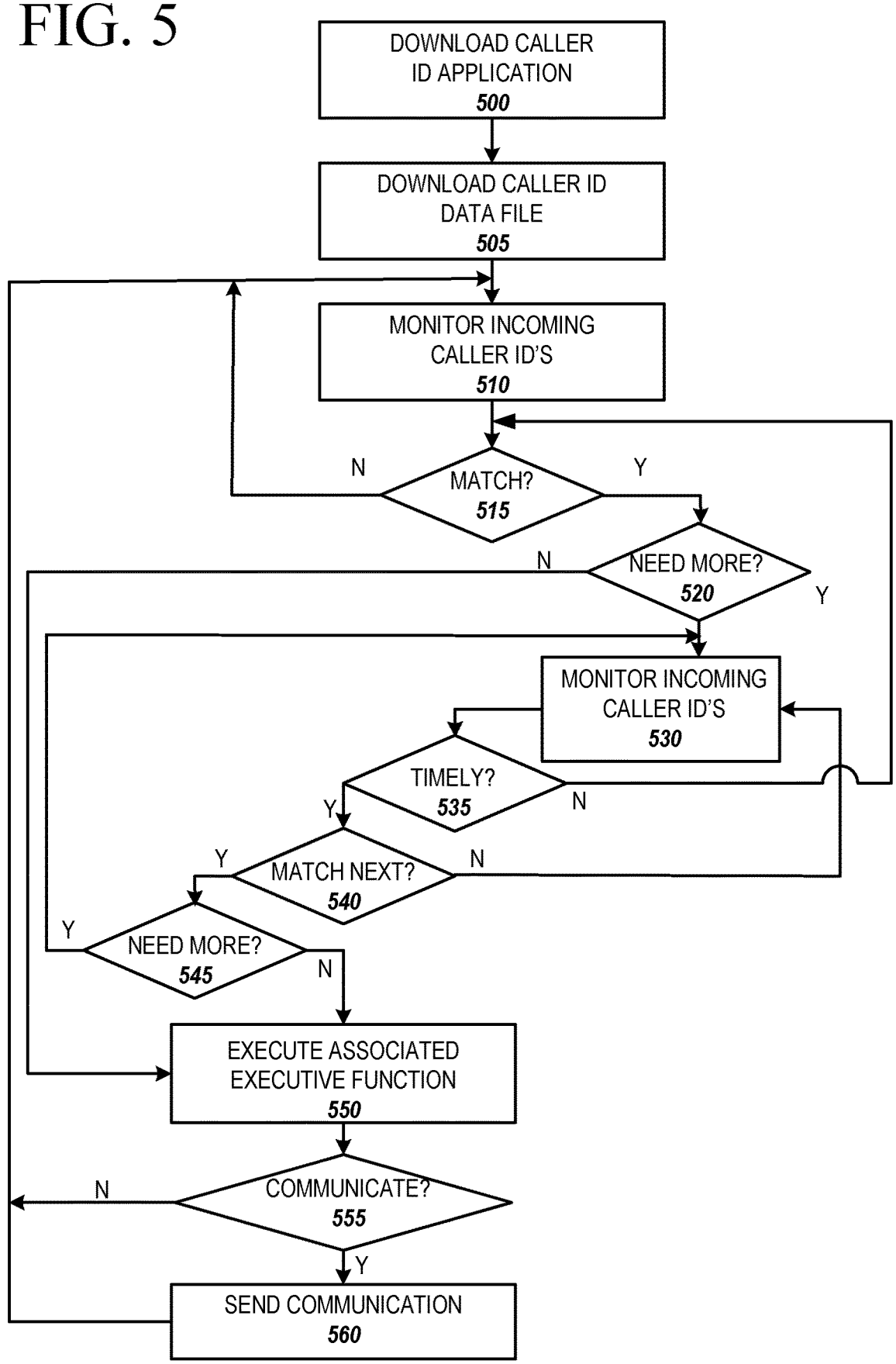
FIG. 5 is a flow diagram of a mobile device implementing an illustrative caller ID management function in accordance with a second embodiment of the invention.

FIG. 5 is a flow diagram of a mobile device implementing a caller ID management function in accordance with a second embodiment of the invention. In this embodiment, multiple phone calls to the mobile device with predesignated caller IDs can cause the mobile device to execute a preloaded function associated with those caller IDs. The use of multiple caller IDs in sequence helps prevent an accidental matching of a caller ID or the intentional misuse of the caller ID management function by unauthorized persons or entities.

In a first step 500, a caller ID application for performing executive functions in response to a receiving a set of matching caller IDs is downloaded onto the mobile device in memory. This caller ID application can be the client side of an enterprise mobile device management (EMDM) software as described herein. This downloading can be accomplished through a hardware port to the mobile device, a network connection, such as WiFi or Bluetooth, with the mobile device, a phone call with the device, a cellular connection, or other methods of downloading authorized software onto the mobile device. This downloading may be performed by the user of the mobile device by logging into a website through a browser to install the caller ID application or through an App store provided by the mobile device manufacturer, the enterprise providing access to their data and software, or any other provider of software applications for mobile devices. Alternatively, the mobile device may be given to a local information technology (IT) professional to download the caller ID application through a variety of connections as described above. If the caller ID application functionality is built into the operating system, then no downloading may be necessary.

In a second step 505, certain predesignated caller ID codes and associated executive functions are also downloaded onto the mobile device in memory. This step can be performed as the caller ID application is downloaded or it can be performed later with the authorization of the caller ID application. This step can also be repeated over time with authorization of the caller ID application to replace, update or add to the caller IDs and associated specific functions as needed. This step can also be performed through the use of a graphical user interface on the mobile device or other similar capability. Each caller ID can include a specific numeric identification (numeric ID), a specific alphanumeric identification (alpha ID), or a combination of both. A separate field may also be utilized to designate which IDs are required for a full match. That is, only a match of the numeric ID may be needed, so the separate field could indicate that no match is needed of the alpha ID. Alternatively, storing a null or dummy value in the numeric or alpha ID can identify what combination is needed for a match. Various software functions can be stored as code in memory for execution upon finding a caller ID match. For example, the numeric ID can be 888-555-8888 and the alpha ID can be ABC-XYZ in a first phone call and 800-555-8000 with DEF-UVW in a second phone call within 5 minutes to comprise a set of caller IDs associated with an executive function. For another example. If the mobile device receives 3 calls in succession from 432-555-4321, 888-555-8888, and 212-555-5434 within 5 minutes, then the mobile device memory is erased or the mobile device is otherwise disabled.

The executive function is a function to be performed by the caller ID application on the mobile device upon receiving the associated caller ID. For example, the executive function may be to erase certain confidential data loaded on the mobile device, to shut down the phone permanently, to erase or disable the caller ID application from the mobile device, to send a location of the mobile device to a predesignated phone number, email address, website, or other recipient, to enable cellular, WiFi or other location tracking capabilities, etc.

In step 510, the caller ID application on the mobile device monitors the caller ID of all incoming phone calls to the mobile device. Of course, the caller ID can be a spoofed caller ID as described below with reference to FIG. 7. In step 515, an incoming phone call caller ID is compared to each of the first predesignated caller IDs stored in memory from step 505 above. If there is not a match, then processing returns to step 510. If there is a match, then processing continues to step 520.

In step 520, the caller ID application then determines whether an additional caller ID match is needed from another phone call. If so, then processing continues to step 530, otherwise processing continues to step 550. In step 530, the caller ID application on the mobile device monitors the caller ID of all incoming phone calls to the mobile device until an incoming phone call with caller ID is detected. There can be a timeout feature implemented whereby if another call is not received within a predesignated period of time, then processing automatically returns to step 510 above. In step 535, it is determined whether the call received is within a predesignated time of the first phone call from step 515. The predesignated time may be standard across all executive functions to be performed or may vary for each executive function to be performed. The predesignated time may be stored in one common area for all executive functions or it may be stored with each executive function and associated caller IDs. The predesignated time may be a max value between calls or a max value for all calls in a sequence or both. Other alternative timing limitations can also be implemented. If the predesignated time is exceeded, then processing returns to step 515 to determine whether the most recent incoming caller ID may be the first caller ID of a new caller ID sequence, otherwise processing continues to step 540. In step 540, it is determined whether the caller ID received matches the next caller ID in a sequence including the previous caller IDs received earlier. If there is not a match, then processing returns to step 530 to continue monitoring for the next caller ID in the current sequence as time has not expired yet as per step 535. That is, a random call may be received by the mobile device while the caller ID sequence is being sent into the mobile device through multiple phone calls. If there is a match in step 540, then processing continues to step 545. In an alternative embodiment, the caller ID sequence may be provided in any order. That is, the third listed caller ID may be received second and still be a match in this alternative embodiment. In step 545, it is determined whether additional caller IDs are needed to complete the current caller ID sequence. If not, and the caller ID sequence is a complete match, then processing continues to step 550, otherwise processing returns to step 530 to wait for the next caller ID in the sequence.

In step 550, the caller ID application causes the operating system of the mobile device to execute the executive function stored in memory. That is, the executive function associated with the just received caller ID is loaded into executable memory and executed to perform that executive function. This can occur whether the mobile device user answers the phone call or not. The executive function can include preventing the user from shutting down the mobile device until the executive function is completed. Once the executive function is completed, then processing continues to step 555 unless the just executed executive function causes an alternative action to be taken by the mobile device. In step 555 it is determined whether the mobile device should communicate success or failure of performing the executive function or even the location of the mobile device. This decision may be standard for every executive function or may vary by executive function. Alternatively, only failures or successes may be communicated. In another alternative, no such determination may be made and steps 555-560 can be eliminated. If such a communication is expected, then processing continues to step 560, otherwise processing returns to step 510 above. In step 560, this communication of success or failure or even location of the mobile device can be performed by making a phone call to a predesignated phone number. In this case, the caller ID of the mobile device will indicate which mobile device is calling to indicate success or failure of the executive function. Alternatively, the mobile device may send a text message, email or other communication to a predesignated phone number or address. In another alternative, the matching caller ID used to invoke the executive function may include a phone number or address for the mobile device to contact. That is, the match may be of the alphanumeric ID and the numeric ID may be the phone number for texting success or failure or it may point to a pre-stored phone number or other message destination in the mobile device. Processing then returns to step 510 above.

FIG. 6 is a block diagram of an illustrative record in a caller ID data file in which various embodiments may be implemented. A record is a set of information within a domain or database that establishes a relationship between a set of data or data elements. A record may be a separate entry into a database, a set of links between data, or other logical relationship between a set of data. In the present example, there is one record for each set of caller IDs associated with a given executive function. For example, a single caller ID may be associated with an executive function, or multiple caller IDs may be needed to invoke a given executive function.

Caller ID data record 600 is part of a caller ID data file, also referred to as a caller ID database, which can be stored on a mobile device in its memory. Caller ID data record 600 can include a reference number 610, a version number 613 and last updated date and time 616. This allows for management of this record to identify each record and to verify that it is up to date. Since more than one caller ID may be needed in sequence, a number of caller IDs 620 and a timing requirement 623 may be provided. For example, if three separate matching caller IDs are needed in three different calls within a 5 minute period, then number of caller IDs 620 may be set to 3, and timing requirement may be set to 5. Alternatively, there may be a maximum of 2 minutes between each of 3 phone calls, so the number of caller IDs 620 may be set to 3, and timing requirement may be set to 2 per phone call. In addition, the type of matching required may be indicated in match requirement 626. For example, only matching numeric IDs may be needed, only alphanumeric IDs may be needed, or both. As described herein, alternative embodiments may utilize null or other dummy characters in a numeric ID or an alphanumeric ID to indicate whether a match is not needed for that field.

Caller ID data file 600 also includes a set of caller ID(s) 630 including numeric ID(s) 633 and alphanumeric IDs 636. Depending on the data provided above, there may be one or more caller IDs for a given caller ID data record 600. As described herein, if this set of caller ID(s) 630 is matched in a timely manner by a sequence of one or more phone calls to the mobile device, then one or more executive function(s) 640 will be executed by the mobile device processor. These executive function(s) 640 can be stored as software code in the caller ID data record 600. Alternatively, pointer(s) may be stored in the caller ID data record to the executive function(s) stored elsewhere on the mobile device. In addition, other fields in caller ID data record 600 may also include pointers to the specific data stored elsewhere in memory on the mobile device. While typically there may be a single executive function to be executed upon receiving a matching set of caller IDs, alternative embodiments may include multiple executive functions to be performed upon receiving a matching set of caller IDs, either in sequence or in parallel. Alternative embodiments may also utilize different approaches to storing this type of information for use as described herein.

Figure 7:
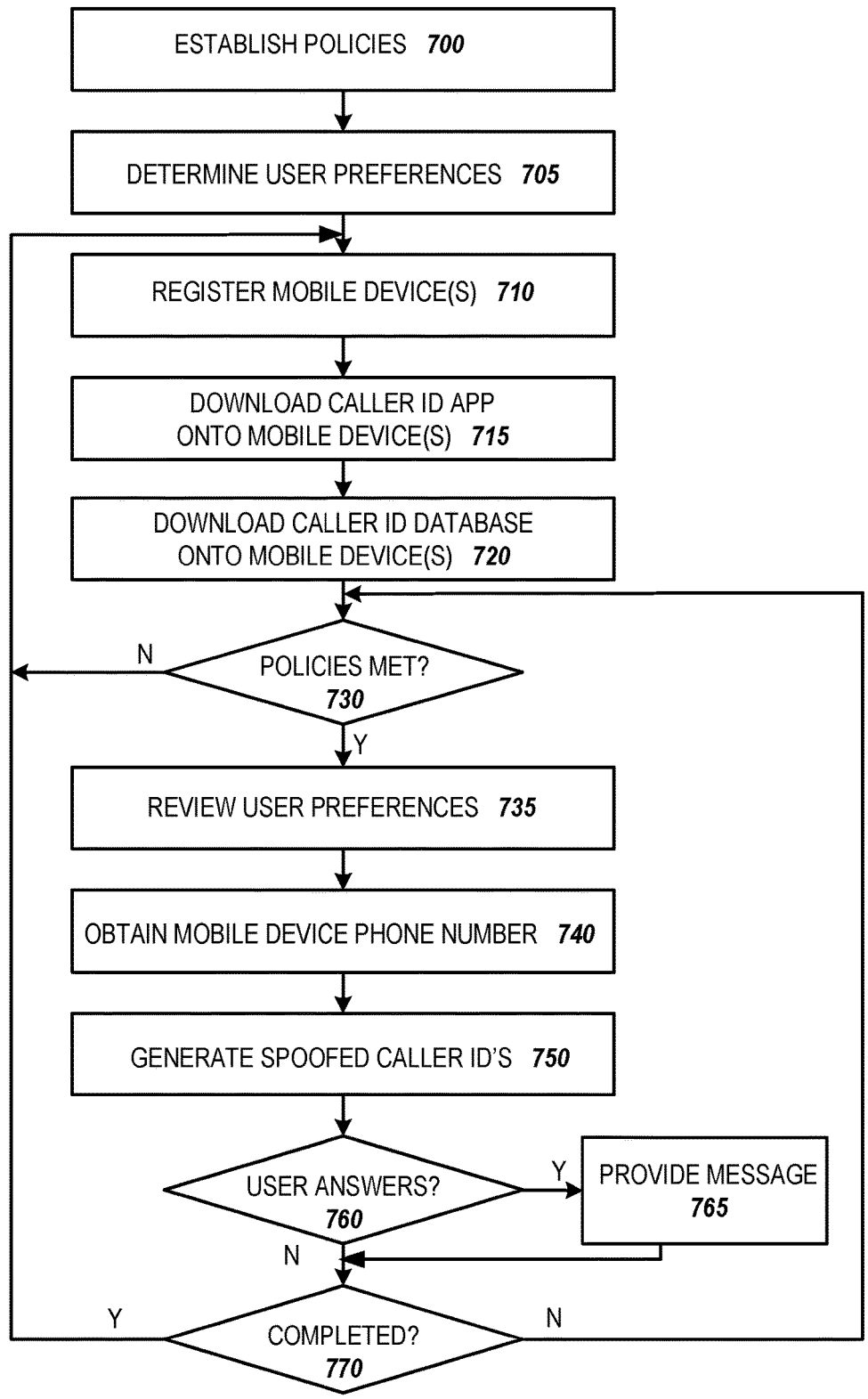
FIG. 7 is a flow diagram of a server implementing an illustrative caller ID management function on a mobile device in which various embodiments may be implemented.

FIG. 7 is a flow diagram of a server implementing a caller ID management function on a mobile device in which various embodiments may be implemented. This caller ID management function can include a caller ID management database or other data structure which contains the data needed to implement the caller ID management function across one or more mobile devices. Although a server is mentioned in this illustrative example, other electronic systems, also referred to herein as a software management system, including cloud based systems could perform the same functions and store the data described herein. The server could be located at a voice or other communication company such as a cellular phone company that can invoke certain executive functions on a mobile device upon request of the mobile device owner or if the mobile device owner violates certain policies of the voice or other communication company such as not paying his or her monthly fees. The server could also be located in a company or other entity that allows its workers to utilize their personal mobile devices to access systems and data of the company. That is, a server or master version of enterprise mobile device management (EMDM) software as described herein can be implemented by utilizing a server based management function on a server or other enterprise managed device. Many other such examples of systems and entities could utilize this type of caller ID management function to manage mobile devices as described herein such as software management system 320.

In a first step 700, a policy is established for invoking certain executive functions in a policy database or other data structure in the caller ID management database on a server or other storage medium. This can include a policy implemented by an entity in an enterprise mobile device management (EMDM) server side software, a policy implemented by a voice or other communication company software, a user based policy implemented by an owner or other user of a mobile device in a cloud or other based data structure, or other implementations of this policy. The policy includes the rules and requirements for utilizing caller IDs to invoke certain associated executive functions. The policy includes certain security features, such as user or information technology (IT) person authentication before implementing a given caller ID. The policy can also include the circumstances under which certain executive functions may be invoked through caller IDs including whether an worker has left a company and has not yet returned the mobile device, whether the mobile device has been stolen, etc. This policy can be general across all mobile devices, classes of mobile devices, or specific to each mobile device.

In a second step 705, user preferences for implementing the policy may be identified or otherwise determined and stored. A policy provides the general condition under which certain executive functions may be invoked through using associated caller ID(s) whereas the user preferences provide more tailored implementation details regarding invoking these executive function. The user preferences may general across all mobile devices, classes of mobile devices, or specific to each mobile device. User preferences may also be standard unless modified by an authorized person. Examples of user preferences include identifying a time of day for performing certain executive functions, a time delay before invoking certain executive functions, a notification to the mobile device user as to the executive functions being invoked, a list of persons authorized to invoke certain executive functions for a given mobile device, a time period for periodically updating the caller ID database stored on a mobile device, etc. These user preferences may be determined by the user or owner of the mobile device, an IT manager, or other authorized person. A separate graphical user interface (GUI) may also be utilized to query the authorized person regarding these policies and user preferences. For example, an authorized person may specify through a GUI for an EMDM or other system that for factory reset of a mobile device, 3 calls should be performed with a maximum of 1 minute between calls and a total maximum time of 2 minutes using caller IDs with the North American number type, the caller IDs to be updated every 30 days. The EMDM system or other system can then handle the process of generating the caller IDs for each executive function for all mobile devices including updating the caller IDs on the system and pushing them out to the mobile devices being managed.

In step 710, mobile devices are then registered with the caller ID management database. Many mobile devices may be registered upon first implementing the caller ID management function and then other mobile devices can be registered over time as they are acquired or granted access to certain entity data and software. This can include storing the phone number and other contact information for the mobile device, the type of mobile device, etc. Then in step 715, a caller ID client application is downloaded or otherwise embedded in each registered mobile device, such as described above with reference to FIGS. 4 and 5 and shown in FIG. 6. This allows the caller ID management function of the server to invoke certain executive functions upon meeting certain conditions as described herein. Phone call(s) with caller ID(s) associated with an executive function could be performed automatically upon a system determining that the condition for that executive function has been met. This determination could be made upon data being provided that indicates the condition has been met. Alternatively, this determination could be made upon data being provided that indicates certain state changes, which are checked periodically or continuously against the condition to determine whether the condition has been met. Then in step 720, a caller ID database is downloaded into each mobile device providing the caller IDs which can be utilized to invoke certain executive functions in each of the mobile devices. This caller ID database can be updated over time, such as may be set forth in the user preferences. The caller IDs to be used for each executive function can be generated randomly or with restrictions based on user preferences. These caller IDs can be the same across multiple mobile devices for a specific executive function, or they can be different for each mobile device for each executive function. In such a case, a large database may be utilized and periodically and may be managed through user preferences. These caller IDs for each executive function and possibly for each device can be generated by an EMDM system, a specialized application, or other methods apparent to those of ordinary skill in the art.

In step 730, it is determined whether certain policies have been met for invoking at least one executive function for one or more mobile devices. For example, a person may have lost his or her phone or a person may have left the employment of an entity. This process could be automatic upon entry of certain conditions within a database. For example, if a worker database is updated by management or human relations to reflect that a worker has quit or is absent, then certain executive functions may be implemented through this process automatically by an EMDM system that polls the worker database or other system. For illustrative purposes, the below describes invoking a single desired executive function for a single mobile device, but the below can be utilized for rapidly invoking multiple executive functions across multiple mobile devices. If no in step 730, then processing returns to step 710 to continue registering mobile devices. Otherwise, in step 735, the user preferences related to that mobile device are reviewed to determine when and how the executive function may be invoked. In step 740, the phone number of the mobile device and the caller IDs associated with the desired executive function are obtained from the caller ID management database.

In step 750, the caller IDs for invoking the associated executive function for the mobile device are spoofed or otherwise generated in a phone call to the mobile device. This can involve placing the phone call to the mobile device through a third party caller ID generating (i.e., spoofing) service or through localized spoofing capabilities. Alternatively, certain low risk or very common executive functions could be invoked by calling from a set phone number without requiring spoofing. Of course, if multiple caller IDs in multiple phone calls within a given time period are required for invoking a given executive function, then multiple phone calls are made to the mobile device with generated caller IDs. Also, if multiple executive functions need to be invoked in sequence (e.g., one to prevent the user from turning off the mobile device followed by other executive functions), then multiple phone calls may be placed with generated caller IDs in sequence.

In step 760, it is determined whether a user of the mobile device answers the phone call. If so, then in step 765 an automated message may be provided, perhaps one that sounds like a person, to not alarm the user. Alternatively, the answering user may simply be told that certain actions are being taken in response to certain policy conditions being met.

In step 770, it is determined whether the executive function has been completed. This can be determined by a return text, email, phone call, or other communication provided by the mobile device to a predesignated phone number, email address, website, or other communication destination. If not, then processing can return to step 730 to determine next steps in accordance with the policies. For example, there may be three tries attempted before taking additional measures to complete the desired result. Otherwise, processing returns to step 710 above as more mobile devices are registered with the caller ID management function.

Figure 8:
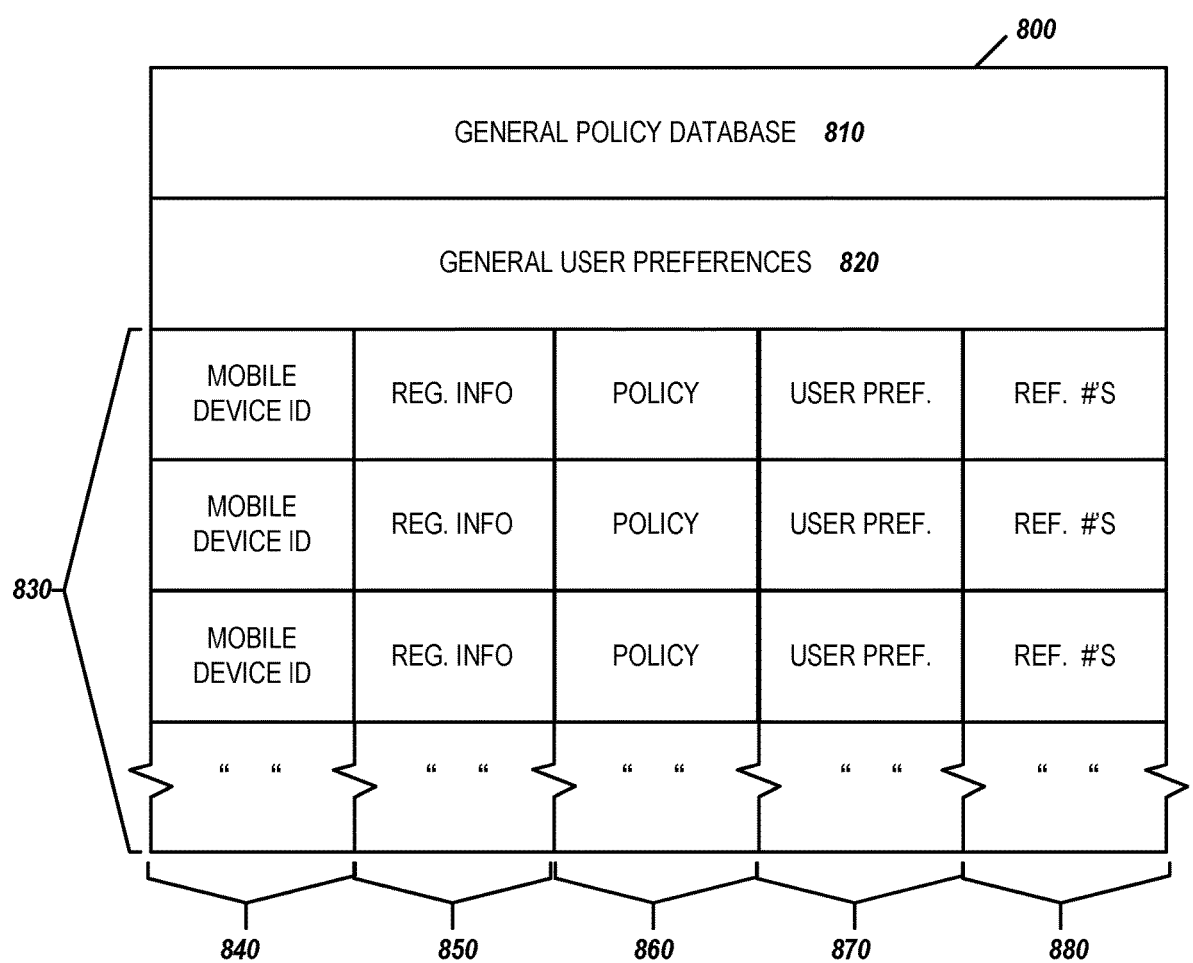
FIG. 8 is a block diagram of an illustrative caller ID management database in which various embodiments may be implemented.

FIG. 8 is a block diagram of an illustrative caller ID management database in which various embodiments may be implemented. Caller ID management database 800 or other data structure contains the data needed to implement the caller ID management function across one or more mobile devices. Although a server is mentioned in this illustrative example, other electronic systems, also referred to herein as a software management system, including cloud based systems could perform the same functions and store the data described herein. The server could be located at a voice or other communication company such as a cellular phone company that can invoke certain executive functions on a mobile device upon request of the mobile device owner or if the mobile device owner violates certain policies of the voice or other communication company such as not paying his or her monthly fees. The server could also be located in a company or other entity that allows its workers to utilize their personal mobile devices to access systems and data of the company. That is, a server or master version of enterprise mobile device management (EMDM) software as described herein can be implemented by utilizing a server based management function on a server or other enterprise managed device. Many other such examples of systems and entities could utilize this type of caller ID management database to manage mobile devices as described herein.

Caller ID management database 800 includes a general policy database 810 for implementation across one or more mobile devices. This policy is established for invoking certain executive functions in certain mobile devices when certain conditions are met. This can include a policy implemented by an entity in an enterprise mobile device management (EMDM) server side software, a policy implemented by a voice or other communication company software, a user based policy implemented by an owner or other user of a mobile device in a cloud or other based data structure, or other implementations of this policy. The policy includes the rules and requirements for utilizing caller IDs to invoke certain associated executive functions. The policy includes certain security features, such as user or information technology (IT) person authentication before implementing a given caller ID. The policy can also include the circumstances under which certain executive functions may be invoked through caller IDs including whether an worker has left a company and has not yet returned the mobile device, whether the mobile device has been stolen, etc. This policy can be general across all mobile devices or for classes of mobile devices. Policy specific for a given mobile device may be stored as described below.

Caller ID management database 800 also includes a set of general user preferences 820 for implementing policy 810. While a policy provides the general condition under which certain executive functions may be invoked through using associated caller ID(s), the user preferences provide more tailored implementation details regarding invoking these executive functions. The user preferences may be general across all mobile devices, by classes of mobile devices, or by reference number. User preferences specific for a given mobile device may be stored as described below. User preferences may also be standard unless modified by an authorized person. Examples of user preferences include identifying a time of day for performing certain executive functions, a time delay before invoking certain executive functions, a notification to the mobile device user as to the executive functions being invoked, a list of persons authorized to invoke certain executive functions for a given mobile device, a time period for periodically updating the caller ID database stored on a mobile device, etc. These user preferences may be determined by the user or owner of the mobile device, an IT manager, or other authorized person. A separate graphical user interface (GUI) may also be utilized to query the authorized person regarding these policies and user preferences.

Caller ID management database 800 further includes a set of mobile device records 830, each record being used for identifying and managing each of the registered mobile devices. Each mobile device record includes a mobile device identifier 840, registration information for that mobile device, any policy specific to that mobile device, any user preferences specific to that mobile device, and registration numbers of caller ID(s) and associated executive functions. Mobile device identifier 840 is a unique identifier of a mobile device such as a serial number, phone number, IMEI (International Mobile Equipment Identifier) number, etc. Registration information 850 includes a variety of information related to that mobile device such as owner name, worker number, serial number, mobile device type, etc. Policy 860 includes any policy specific to that mobile device such as a whether the device should be fully or partially disabled upon certain conditions given the prior history of the user of the mobile device. User preferences 870 includes any user preferences specific to that mobile device such as the time of day that updates to the mobile device caller ID records may be performed. Reference numbers 880 refer to the reference numbers 610 in the records shown in FIG. 6 above. That is, an extensive list of records such as shown in FIG. 6 may be stored on the server and then downloaded or updated to each mobile device based on the reference numbers stored in record 830 for that mobile device. Of course, alternative embodiments may utilize other data structures or approaches to implement the elements of the invention described herein.

FIGS. 9A-9C are block diagrams of illustrative policy, user preference and executive function databases in which various embodiments may be implemented. FIGS. 9A-9C are example databases illustrated in FIG. 8 above. Alternative embodiments may utilize different arrangements of the various elements as well as different elements.

FIG. 9A is an illustrative general policy database 900 which can represent the general policy database 810 described above. General policy database 900 includes a variety of policies that include the conditions for invoking executive functions in various mobile devices. This database may be generated by direct programming, through the use of a graphical user interface, or other well-known techniques. This database is intended for use across multiple mobile devices. A more specific policy database may also be similarly arranged for each mobile device, such as shown as policy 860 described above.

General policy database 900 can include descriptors 905, which may be included for purposes of documentation for a programmer or other user of the database. General policy database 900 further includes a set of policy records 910, each record being used for identifying and managing each of the general policies implemented for managing executive functions across multiple mobile devices through the use of caller ID. Each general policy record includes a policy number 920, a mobile device class 922, a set of conditions 924, a reference number 926, and additional reference number or numbers 928. Alternative embodiments may utilize different types of elements for each policy record.

Policy number 920 is an identifier of each general policy. In this example, the policy numbers are shown sequentially, but they may be organized in alternative configurations. Class 922 is for identifying which types or class of mobile devices each policy applies to. For example, a policy may apply to all mobile devices, only mobile phones, or other classes such as whether the mobile device is used by an worker in management or not. Condition(s) 924 includes the conditions whereby that general policy may be implemented. For example, if the mobile device was just reported lost and no efforts have been made to recover that mobile device through the use of caller ID, then a certain executive function in such a lost mobile device may be invoked through the use of caller ID. That is, a certain caller ID may be utilized to cause the lost mobile device to text or otherwise signal its location to a dedicated electronic destination. Reference numbers 926 and 928 are reference numbers for identifying the desired executive function(s) to be invoked on the mobile devices. If more than one reference number is provided, those referenced executive functions may be implemented in sequence. That is, more than one executive function may be invoked under certain circumstances. The executive functions referenced by these reference numbers are described in greater detail below in FIG. 9C.

FIG. 9B is an illustrative general user preferences database 940 which can represent the general user preferences 820 described above. General user preferences database 940 includes a variety of user preferences that provide more tailored implementation details regarding invoking these executive functions in various mobile devices. This database may be generated by direct programming, through the use of a graphical user interface, or other well-known techniques. This database is shown by reference number and is intended for use across multiple mobile devices. Alternative embodiments may be organized by class or mobile device or other arrangement. A more specific user preference database may also be similarly arranged for each mobile device, such as shown as user preferences 870 described above.

General user preferences database 940 can include descriptors 945, which may be included for purposes of documentation for a programmer or other user of the database. General user preferences database 940 further includes a set of user preference records 950, each record being used for identifying and managing each of the reference numbers implemented for managing executive functions across multiple mobile devices through the use of caller ID. Each user preference record includes a reference number 960, a class of mobile device 962, a number of caller IDs 964, a max time limit for providing these caller IDs to invoke an executive function 966, an order of caller IDs 968, other user preferences 970, and a time period for updating caller IDs for a given reference number 972. Alternative embodiments may utilize different types of elements for each user preference record.

Reference number 960 an identifier of each executive function to which a set of user preferences may apply. In this example, the reference numbers are shown sequentially, but they may be organized in alternative configurations. The executive functions referenced by these reference numbers are described in greater detail below in FIG. 9C. Class 962 is for identifying which types or class of mobile devices each set of user preferences applies to. For example, a set of user preferences may apply to all mobile devices, only mobile phones, or other classes such as whether the mobile device is used by a worker in management or not. One reference number 960 may be utilized for different classes of mobile devices, as shown with reference number 002. That is, for reference number 002, the system utilized one set of user preferences for mobile phones and a different set of user preferences for all other types of mobile devices. Sequence number 964 provides the number of sequential caller ID numbers should be utilized to invoke a given executive function. That is, only one specific caller ID and call is needed, or multiple caller IDs with multiple phone calls are needed to invoke a given executive function. Time limit 966 provides the maximum time allowed for this sequence of phone calls with caller IDs to be called. Alternatively, there may be a maximum time limit between each of the multiple phone calls rather than a total time limit. Of course, if there is only a single phone call, no time limit is given. Sequence order 968 is an expected order that the phone calls with caller ID are to be given. That is, a specific sequence may be required or the caller IDs could be in random order. Other user preferences 970 can also be provided. This can include the format of caller ID number provided (e.g., by country, by area code, etc.), language of the caller ID alphanumeric value, etc. A time period for updating a given set of caller IDs for a given reference number is also provided. For example, the caller IDs for a given executive function may need to be updated weekly, monthly, quarterly or other time period.

FIG. 9C is an illustrative executive function database 980 which can represent the executive function reference numbers 880 described above. Executive function database 980 includes a variety of executive functions to be invoked in various mobile devices. This database may be generated by direct programming, through the use of a graphical user interface, or other well-known techniques. This database is shown by reference number and is intended for use across mobile devices in accordance with the policies and user preferences described above.

Executive function database 980 can include descriptors 982, which may be included for purposes of documentation for a programmer or other user of the database. Executive function database 980 further includes a set of executive function records 984, each record being used for identifying and managing each of the executive functions across multiple mobile devices through the use of caller ID. Each executive function record includes a reference number 990, a description 992, and data and code 994 needed for implementing that executive function. Reference number 960 an identifier of each executive function to which a set of user preferences may apply. In this example, the reference numbers are shown sequentially, but they may be organized in alternative configurations. Description 992 provides a human readable description of the executive function. Data/Code 994 includes the data and code necessary for implementing the identified executive function. Data/Code could be a pointer to data and code needed for various types of mobile devices or to a pointer table listing various types of mobile devices. That is, one type of data or code may be utilized for one type of mobile phone from one manufacturer and another type of data and code may be utilized for another type of mobile phone from another manufacturer. Executive database can also include a set of caller IDs to be utilized for invoking each executive function. This set of caller IDs can be downloaded with the data and code for invoking that executive function onto each mobile device to be managed as described herein. In an alternative embodiment, a separate set of caller IDs may be utilized for each mobile device for each executive function. That is, the set of caller IDs used to invoke a factory reset on one mobile device may be different than another mobile device. In such a case, a separate database may be utilized for managing the set of caller IDs for each executive function for each mobile device. This can be managed by an EMDM system as described above, through user preferences, from a pool of acceptable caller IDs, or other methods apparent to those of ordinary skill in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or other programming languages such as Swift, Objective-C, Java, Kotlin, C++, etc. The computer readable program instructions may execute entirely on the user's computer or mobile device, partly on the user's computer or mobile device, as a stand-alone software package, partly on the user's computer or mobile device and partly on a remote computer or mobile device or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for utilizing caller ID for managing a mobile device. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. For example, a deskside system may include an active phone application across the internet which can be called using the caller ID function described herein. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of utilizing caller identification (ID) for managing a mobile device comprising:
   receiving a policy for invoking an executive function on the mobile device upon a condition being met wherein the executive function is a function performed by a processor of the mobile device beyond call filtering;
   determining one or more caller IDs associated with the executive function, wherein the one or more caller IDs are associated with the executive function and wherein multiple phone calls are placed to the mobile device to invoke the executive function, each phone call including a spoofed one of the one or more caller IDs;
   providing a caller ID application to the mobile device which will perform the executive function upon the mobile device receiving a phone call with the one or more caller IDs that is associated with the executive function; and
   responsive to meeting the condition of the policy, placing a phone call to the mobile device with a caller ID matching the one or more caller IDs associated with the executive function.

2. The method of claim 1 further comprising obtaining user preferences for managing the one or more caller ID associated with the executive function.

3. The method of claim 2 wherein the user preferences for managing the one or more caller ID associated with the executive function include user preferences for determining the one or more caller ID associated with the executive function.

4. The method of claim 2 further comprising storing in a caller ID management database the policy including the condition, the executive function to be invoked upon the condition being met, the one or more caller IDs to be utilized when calling the mobile device to invoke the associated executive function, and the user preferences for managing the one or more caller IDs associated with the executive function.

5. The method of claim 1 further comprising including a set of time limits to place the multiple phone calls to the mobile device to invoke the executive function.

6. The method of claim 5 wherein the user preferences for managing the one or more caller IDs associated with the executive function include user preferences for determining the set of one or more caller IDs associated with the executive function and the time limits to place the multiple phone calls to the mobile device to invoke the executive function.

7. The method of claim 1 wherein the policy for invoking the executive function on the mobile device includes, upon the condition being met, a second executive function to be invoked through the use of a second caller ID associated with the second executive function.

8. A computer program product for utilizing caller identification (ID) for managing a mobile device, the computer program product comprising a computer readable non-transitory storage medium having program instructions embodied therewith, the program instructions executable by a processing circuit to cause the device to perform a method comprising:
   receiving a policy for invoking an executive function on the mobile device upon a first condition being met wherein the executive function is a function performed by a processor of the mobile device beyond call filtering;
   determining one or more caller IDs associated with the executive function, wherein the one or more caller IDs are associated with the executive function and wherein multiple phone calls are placed to the mobile device to invoke the executive function, each phone call including a spoofed one of the one or more caller IDs;
   providing a caller ID application to the mobile device which will perform the executive function upon the mobile device receiving a phone call with the one or more caller IDs that is associated with the executive function; and
   responsive to meeting the first condition of the policy, placing a phone call to the mobile device with a caller ID matching the one or more caller IDs associated with the executive function.

9. The computer program product of claim 8 further comprising obtaining user preferences for managing the one or more caller IDs associated with the executive function.

10. The computer program product of claim 9 wherein the user preferences for managing the one or more caller IDs associated with the executive function include user preferences for determining the one or more caller IDs associated with the executive function.

11. The computer program product of claim 9 further comprising storing in a caller ID management database the policy including the condition, the executive function to be invoked upon the condition being met, the one or more caller IDs to be utilized when calling the mobile device to invoke the associated executive function, and the user preferences for managing the one or more caller IDs associated with the executive function.

12. The computer program product of claim 8 further comprising including a set of time limits to place the multiple phone calls to the mobile device to invoke the executive function.

13. A data processing system for utilizing caller identification (ID) for managing a mobile device, the data processing system comprising:
   a processor; and
   a non-transitory memory storing program instructions which when executed by the processor execute the steps of:
   receiving a policy for invoking an executive function on the mobile device upon a first condition being met wherein the executive function is a function performed by a processor of the mobile device beyond call filtering;
   determining one or more caller IDs associated with the executive function, wherein the one or more caller IDs are associated with the executive function and wherein multiple phone calls are placed to the mobile device to invoke the executive function, each phone call including a spoofed one of the one or more caller IDs;
   providing a caller ID application to the mobile device which will perform the executive function upon the mobile device receiving a phone call with the one or more caller IDs that is associated with the executive function; and
   responsive to meeting the first condition of the policy, placing a phone call to the mobile device with a caller ID matching the one or more caller IDs associated with the executive function.

14. The data processing system of claim 13 further comprising obtaining user preferences for managing the one or more caller IDs associated with the executive function.

15. The data processing system of claim 14 wherein the user preferences for managing the one or more caller IDs associated with the executive function include user preferences for determining the one or more caller IDs associated with the executive function.

16. The data processing system of claim 14 further comprising storing in a caller ID management database the policy including the condition, the executive function to be invoked upon the condition being met, the one or more caller IDs to be utilized when calling the mobile device to invoke the associated executive function, and the user preferences for managing the one or more caller IDs associated with the executive function.

17. The data processing system of claim 13 further comprising including a set of time limits to place the multiple phone calls to the mobile device to invoke the executive function.

* * * * *